Patented May 27, 1941

2,243,330

UNITED STATES PATENT OFFICE 2,243,330

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 27, 1940, Serial No. 342,733

12 Claims. (Cl. 252—331)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in our process consists of a water-soluble, surface-active polyglycol ether derived by reacting an alkylene oxide with an alkylated monocyclic, monohydric, water-insoluble phenol characterized by the fact that the nuclear carbon atom-alkyl radical linkage involves a tertiary carbon atom of the alkyl group, and additionally characterized by the fact that the longest alkyl radical carbon atom chain, beginning with the linking tertiary carbon atom as unity, contains at least three carbon atoms and not more than five carbons.

It is well known that various hydroxy hydrocarbon compounds, for instance, long chain alcohols, hydroxylated alicyclic compounds, phenol, and the like can be treated with materials such as ethylene oxide, propylene oxide, butylene oxide, amylene oxide, glycid, epichlorhydrin, and the like to produce glycol ethers. For purposes of convenience reference to an alkylene oxide is intended to mean the type commonly referred to as an alpha-beta alkylene oxide, i. e., where an oxygen atom represents a linkage between two adjacent carbon atoms, although the oxygen linkage does not necessarily involve a terminal carbon atom. Any functional equivalents, such as glycid, epichlorhydrin, or the like, are intended to be included within the expression "alkylene oxide," as employed in the hereto appended claims. The introduction of the polymerized alkylene oxide chain or re-occurring ether linkage converts a water-insoluble phenol of the kind described into a water-soluble product.

Oxy-alkylation of water-insoluble hydroxy hydrocarbons of the kind previously referred to, in order to render the same water-soluble and more particularly in order to render them surface-active, is a well-known procedure. An alkylene oxide may be added in gaseous or liquid phase to the liquid or melted phenolic body of the kind described at a temperature at which the alkylene oxide is absorbed by the phenol and which generally lies between 50° C. and 250° C. It is usually preferable to cause the phenolic body to react with the selected alkylene oxide in a closed vessel so constructed that suitable pressure may be employed, for instance, a pressure varying for example, from 100 pounds gauge pressure to 1000 pounds gauge pressure. It is often desirable to apply heat in the initial stage of the reaction and then depend on the heat of reaction to complete combination. In some instances it is necessary to slow the reaction speed by means of a suitable cooling system. In these reactions the length of the polyglycol ether chain is determined by the proportion of alkylene oxide caused to react. In any event, the amount employed must be sufficient to produce water solubility, but not in such proportions that surface activity is lost. This particular point will be discussed in detail subsequently. It is well known that various catalysts may be employed for the formation of the polyethers; and the particularly describable catalysts will include caustic alkalies, alkali alcoholates, tertiary non-hydroxylated organic bases, and the like; and furthermore in some instances at least, acid compounds such as potassium bisulfate may be employed.

Such oxy-alkylated products, including those derived from primary or secondary amines, are of distinct value in the treatment of oil field emulsions. The present process is characterized by the fact that we have discovered that a very narrow specific class of a certain type of phenol, upon oxy-alkylation, yields an unusually effective demulsifying agent. This particular narrow class or species or sub-species is markedly more effective and more valuable as a demulsifier than the members of the broad class or division. Apparently an examination of the chemical properties, chemical structure, or physical properties of this particular type of oxy-alkylated phenol fails to reveal any particular characteristic which can account for such unusual effectiveness as a demulsifier.

The phenols employed are of the monohydric monocyclic type and are characterized by being water insoluble and containing at least one alkyl radical, characterized by being joined to a nuclear carbon atom by a linkage with a tertiary carbon atom. Furthermore, such alkyl radicals are characterized by the fact that the longest carbon atom chain, counting the linking tertiary carbon atom as unity, contains at least three carbon atoms and not more than five carbon atoms. The smallest group which is suitable for such is one which contains a tertiary amyl group. It is understood, of course, that two such alkyl groups may be present, for instance, two tertiary amyl groups. It is not intended to exclude the possibility of some other group, such as a methyl group, ethyl group, propyl group, butyl group, n-amyl group, or the like. In view of the description of the type of alkyl group which must be present, it hardly appears necessary to elaborate further; but purely by way of illustration the following examples of suitable alkyl are included:

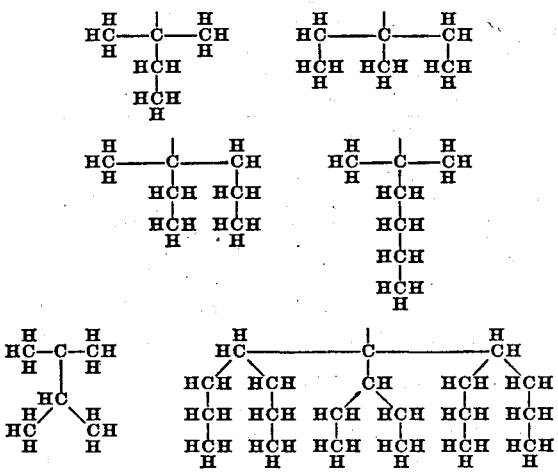

It will be noted that in each instance the linking carbon atom is a tertiary carbon atom and also in each instance the longest carbon atom chain of the alkyl radical, counting the tertiary carbon atom attached to the aromatic nucleus as unity, contains at least three carbon atoms and not more than five carbon atoms. In a general way examination of the formula shows that the number of carbon atoms in the alkyl radical represents a minimum of five and a potential maximum of approximately 20 carbon atoms.

In actual practice no effort is necessary to select a specific single compound, although, as will be pointed out, in the preferred example certain specific compounds give excellent demulsifying agents. Actually the phenols employed may frequently represent mixtures derived from reactions involving an aromatic material and cogeneric hydrocarbon bodies. For instance, a petroleum hydrocarbon fraction representing a mixture of branched chain compounds, may be converted into the alcohols, and the tertiary alcohols separated. Such tertiary alcohols react readily with HCl to give the chloride. Similarly the mixed secondary and tertiary alcohols can be treated with HCl so that only the tertiary alcohols are converted into the halide. The halogen derivative can then be reacted with benzene in the usual manner employed in the Freidel-Crafts reaction or some similar reaction. Generally speaking, aluminum chloride is used as catalyst. The product so obtained is subjected to sulfonation, so as to yield a sulfonic acid which is then either hydrolyzed with the elimination of the sulfonic group and is replaced by a hydroxyl group, or else it is subjected to the conventional caustic fusion procedure to bring about the same change. Needless to say, instead of starting with benzene, one may start with toluene, xylene, ethyl benzene, propyl benzene, cymene, etc., although one may conduct the reaction so as to introduce two alkyl radicals of the kind described, i. e., in which the linkage involves a tertiary carbon atom, etc. In some instances it appears that phenolic material may be isolated from petroleum sources and that such phenols may be the type herein contemplated as raw materials without further reaction. See Industrial & Engineering Chemistry, volume 32, No. 4, page 489. For sake of brevity, it is believed that the description of the insoluble phenols contemplated for treatment with ethylene oxide or the like has been sufficient. They may be obtained in any suitable manner.

It is to be noted that such phenolic body is water-insoluble prior to treatment with an alkylene oxide and that it becomes water-soluble upon treatment with an alkylene oxide or its equivalent. It should be noted that the treatment with an alkylene oxide or its equivalent is necessary in all instances to produce water solubility if the product was previously insoluble; yet excessive treatment should be avoided in that the compound may become too hydrophile. Generally speaking, it is safe to treat the water-insoluble phenol with ethylene oxide so as to increase its weight not less than 150% and usually not more than 250% and possibly 300% in some cases. Such procedure is generally a satisfactory guide; and if some other alkylene oxide is employed, for instance, propylene oxide, then, of course, an increased amount of alkylene oxide must be employed, based on the increased molecular weight of the propylene oxide and the like, and also based on the fact that its solubilizing effect per mole is somewhat less than that of ethylene oxide. If too great an amount of ethylene oxide is used, the resultant product passes through a water-soluble, surface-active stage and then reaches an advanced stage where it is water-soluble but substantially free from surface activity. Generally speaking, six to fifteen moles of ethylene oxide or the equivalent per mole of alkylated phenol is sufficient. As the carbon atoms in the alkyl chain increase, for instance, where a tertiary hexyl phenol is used or a tertiary heptyl phenol or where a phenol is used containing two tertiary amyl groups, the amount must be increased.

Another convenient guide is that for each carbon atom present in the original water-insoluble phenol, one must add one-half molecular proportion of ethylene oxide and possibly a greater amount of an alkylene oxide of higher molecular weight is employed. It must also be remembered that the solubility of the product obtained varies somewhat with the method of manufacture and the particular catalyst which is present. It may be well to indicate that this is one of the reasons that the exact composition of the compounds cannot be indicated as satisfactorily as might be desired in all instances. If solubility is not obtained with any other alkylene oxide, then ethylene oxide should be employed, because it appears to be best suited for the reason that it reacts most readily and because it promotes water solubility to a greater degree than other alkylene oxides or the equivalent. Glycid, of course, or a similar compound is just as satisfactory as ethylene oxide. In any event, water solubility can always be obtained; and the range of surface activity is such that there is no difficulty in stopping short of the point where surface activity will disappear due to the presence of unusually excessive hydrophile properties.

It may be well to emphasize what has been said previously in regard to surface activity of the water-soluble compound. If a dilution of the water soluble reaction product of one part in 3,000 or one part in 5,000 or one part in 20,0000 no longer shows any decrease in the surface tension of the resulting solution, as compared with the raw water from which it was prepared, then one has obtained a water-soluble product from the parent water-insoluble material; but surface activity has been destroyed due to the introduction of an extremely hydrophilic property. Needless to say, such product should be removed and the changes made in the introduction of the alkylene oxide along the lines previously indicated, so as to obtain a product which is water soluble and also surface active. In order that it be understood that such extremely hydrophilic compounds are not contemplated for use in the present process, it should be noted that the hereto appended claims are limited to the surface-active type.

Furthermore, it is to be pointed out that the products herein contemplated are not limited to any particular method of manufacture. It may be desirable to react the ethylene oxide with the selected phenolic bodies in several stages and to test the material at the end of each stage. In other words, oxy-alkylation may be carried out in a two-stage process, a three-stage process, a four-stage process, or the like. This will be obvious to a person skilled in the art. Furthermore, it is not necessary that all stages be carried out with the same alkylene oxide. For instance, the first stage might be conducted with propylene oxide or butylene oxide, and subsequent stages, with ethylene oxide. Indeed, we have found it most convenient to treat the selected phenol with one mole of the alkylene oxide, such as ethylene oxide, and then employ the hydroxy ether so obtained as a raw material for subsequent oxy-alkylation. As a matter of fact, it happens that various suitable ether compounds are available as raw materials in the usual commercial channels; and our preference is to use such compounds. For instance, reference is made to paratertiaryamylphenoxy ethanol, ditertiaryamylphenoxy ethanol, and similar derivatives involving hexyl-heptyl, and other similar radicals.

Our preferred reagent is exemplified by the following compounds:

*Example 1*

200 pounds of paratertiaryamylphenoxy ethanol are treated with 175 pounds of ethylene oxide in presence of approximately three-fourths of a pound of suspended sodium methylate. As the reaction proceeds the sodium methylate either dissolves or is converted into the soluble compound by chemical combination. Reaction is conducted at approximately 125° C. and 200–250 pounds pressure for approximately an hour and a half to 2½ hours until the reaction appears to be complete. The product is then treated with a second portion of ethylene oxide (approximately 75 lbs.) and this reaction is conducted at approximately 110° C. and at a gauge pressure of approximately 100 lbs.

*Example 2*

280 lbs. of di(tertiaryamyl)phenoxy ethanol is substituted for the paratertiaryamylphenoxy ethanol in Example 1 preceding. In the present instance it is usually necessary to give a third treatment of ethylene oxide involving the use of approximately 300–500 pounds of ethylene oxide.

*Example 3*

Phenols derived from kerosene in the manner previously indicated and characterized by the presence of a tertiary carbon chain of the kind described having four carbon atoms, are substituted in place of the phenols employed in the preceding examples. Water-soluble compounds are obtained using the preceding information as a guide in regard to the amount of ethylene oxide to be added.

*Example 4*

The same procedure is employed as in the preceding example except that one employs phenols from the same source but characterized by having present alkyl radicals in which the longest tertiary carbon chain as described consists of five carbon atoms.

*Example 5*

Paratertiaryamylphenoxy propanol is treated in the manner above described.

*Example 6*

Paratertiaryamylphenoxy butanol is treated in the manner described in the preceding examples.

*Example 7*

Di(tertiaryamyl)phenoxy propanol is treated in the manner described in the preceding examples.

*Example 8*

Di(tertiaryamyl)phenoxy butanol is treated in the manner described in the preceding examples.

*Example 9*

An isomeric mixture of tertiaryhexylphenoxy ethanol is treated with ethylene oxide in the manner previously described.

*Example 10*

Paratertiaryheptylphenoxy ethanol is treated with ethylene oxide in the manner previously described.

Our preferred reagent is of the type where the four-carbon or five-carbon chain of the alkyl group, including the tertiary carbon atom as unity, occurs only once rather than the type in which such chain occurs two times or three times.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to the emergence of said well fluids. This particular type of application is decidedly feasible when the demulsifier is used in connection with acidification of calcareous oil-bearing strata, especially if suspended in or dissolved in the acid employed for acidification.

Having thus described our invention, what we claim as new and desire to secure by Letters Patent is:

1. A process for breaking petroleum emulsions of the water-in-oil type, which consists in subjecting the emulsion to the action of a demulsifying agent comprising a water-soluble, surface-active, polyglycol ether derived by reacting an alkylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical carbon atom chain beginning with the linkage tertiary carbon atom as unity, contains at least three carbon atoms and not more than five carbon atoms.

2. A process for breaking petroleum emulsions of the water-in-oil type, which consists in subjecting the emulsion to the action of a demulsifying agent comprising a water-soluble, surface-active, polyglycol ether derived by reacting an alkylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical carbon atom chain beginning with the linking tertiary carbon atom as unity, contains at least three carbon atoms and not more than five carbon atoms; said alkylene oxide being characterized by having at least 2 carbon atoms and not more than 4 carbon atoms.

3. A process for breaking petroleum emulsions of the water-in-oil type, which consists in subjecting the emulsions to the action of a demulsifying agent comprising a water-soluble, surface-active, polyglycol ether derived by reacting an alkylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical carbon atom chain beginning with the linking tertiary carbon atom at unity, contains at least three carbon atoms and not more than five carbon atoms; said alkylene oxide being characterized by having at least 2 carbon atoms and not more than 3 carbon atoms.

4. A process for breaking petroleum emulsions of the water-in-oil type, which consists in subjecting the emulsion to the action of a demulsifying agent comprising a water-soluble surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical carbon atom chain beginning with the linking tertiary carbon atom as unity, contains at least three carbon atoms and not more than five carbon atoms.

5. A process for breaking petroleum emulsions of the water-in-oil type, which consists in subjecting the emulsion to the action of a demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 5 carbon atoms.

6. A process for breaking petroleum emulsions of the water-in-oil type, which consists in subjecting the emulsion to the action of a demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 4 carbon atoms.

7. A process for breaking petroleum emulsions of the water-in-oil type, which consists in subjecting the emulsion to the action of a demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 3 carbon atoms.

8. A process for breaking petroleum emulsions of the water-in-oil type, which consists in subjecting the emulsion to the action of a demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 3 carbon atoms; and additionally characterized by the fact that there are not more than two such 3-carbon atom chains in the alkyl radical.

9. A process for breaking petroleum emulsions of the water-in-oil type, which consists in subjecting the emulsion to the action of a demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 3 carbon atoms; and additionally characterized by the fact that there is not more than one such 3-carbon atom chain in the alkyl radical.

10. A process for breaking petroleum emulsions of the water-in-oil type, which consists in subjecting the emulsion to the action of demulsifying agent comprising a water-soluble, surface-active, polyglycol ether derived by reacting ethylene oxide with an alkylated monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linking tertiary carbon atom as unity, contains 3 carbon atoms; and additionally characterized by the fact that there is not more than one such 3-carbon atom chain in the alkyl radical; said phenol being characterized by freedom from all alkyl radicals except the type just enumerated.

11. A process for breaking petroleum emulsions of the water-in-oil type, which consists in subjecting the emulsion to the action of a demulsifying agent comprising a water-soluble surface-active, polyglycol ether derived by reacting ethylene oxide with a monoalkylated, monocyclic, monohydric, water-insoluble phenol, characterized by the fact that the nuclear carbon atom-alkyl radical linkage involves a tertiary carbon atom of the alkyl group, and additionally characterized by the fact that the longest alkyl radical-carbon atom chain beginning with the linkage tertiary carbon atom as unity, contains 3 carbon atoms; and additionally characterized by the fact that there is not more than one such 3-carbon atom chain in the alkyl radical; said phenol being characterized by freedom from all alkyl radicals except the type just enumerated.

12. A process for breaking petroleum emulsions of the water-in-oil type, which consists in subjecting the emulsion to the action of a demulsifying agent comprising a water-soluble, surface-active, polyglycol ether derived by reacting ethylene oxide with paratertiaryamylphenoxy ethanol.

MELVIN DE GROOTE.
BERNHARD KEISER.